Dec. 4, 1934.  R. BOYD  1,983,119
AUTO BED
Filed Aug. 4, 1933  2 Sheets-Sheet 1

Randolph Boyd
Inventor

By C. A. Snow & Co.
Attorneys.

Dec. 4, 1934.  R. BOYD  1,983,119
AUTO BED
Filed Aug. 4, 1933   2 Sheets-Sheet 2

Randolph Boyd
Inventor

Patented Dec. 4, 1934

1,983,119

UNITED STATES PATENT OFFICE 1,983,119

AUTO BED

Randolph Boyd, Galva, Ill.

Application August 4, 1933, Serial No. 683,683

1 Claim. (Cl. 155—7)

This invention aims to provide a simple means whereby a comfortable bed may be had in an automobile.

A preferred form is shown, but a mechanic, working within the scope of what is claimed, can change that form, without departing from the spirit of the invention.

Figures 1, 2:
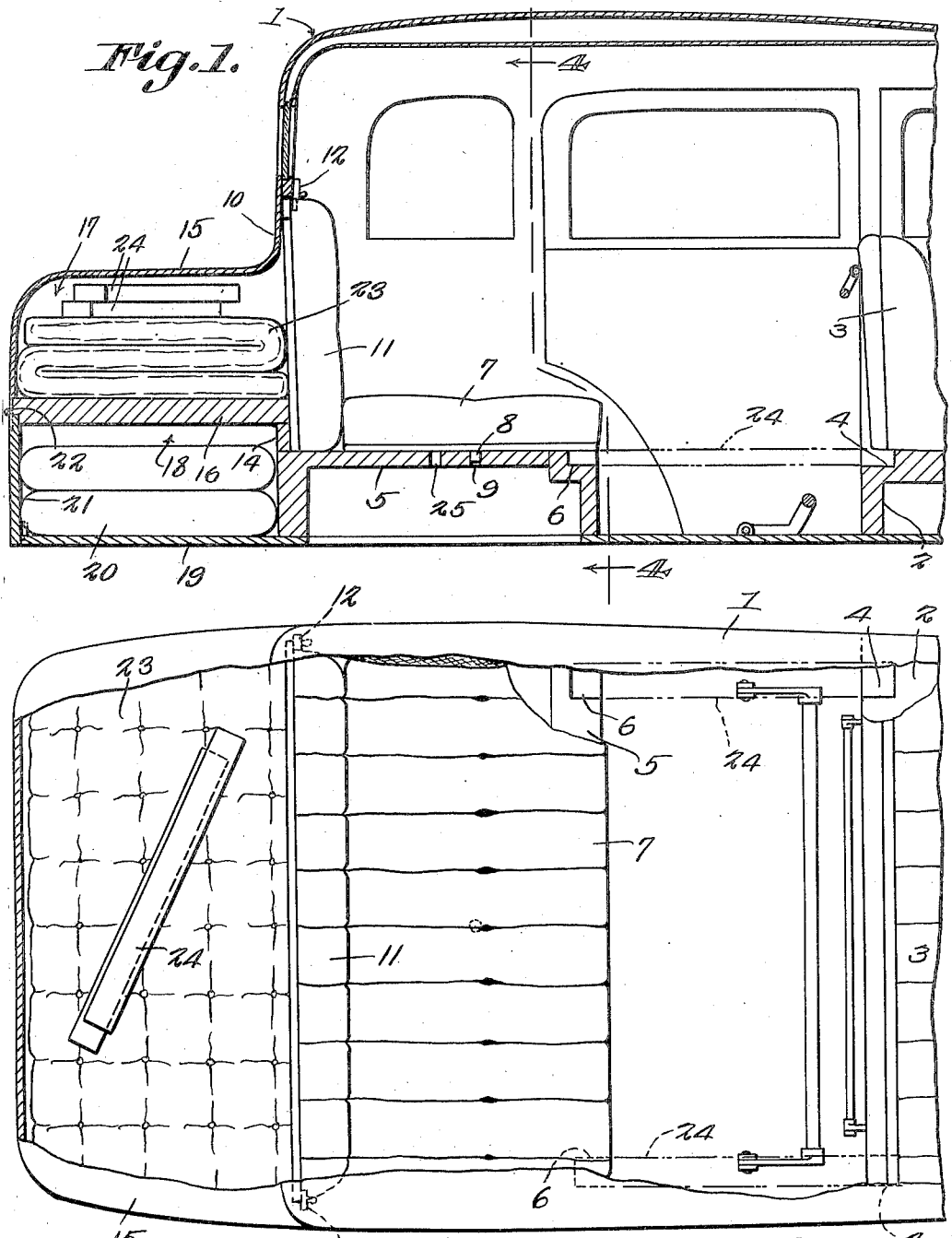
Fig. 1 is a longitudinal section wherein the parts are arranged as they will appear when the bed is not in use.
Fig. 2 is a top plan, with parts broken away, showing the structure as delineated in Fig. 1.

The numeral 1 marks a body of an auto. The base of the front seat is shown at 2. The back of the front seat is shown at 3. There are recesses 4 in the front seat base 2, near to the sides of the body.

The base of the rear seat is shown at 5. In the forward part of the base 5 of the rear seat there are recesses 6, located directly behind the recesses 4 in the base 2 of the front seat. The base 5 supports a first or rear seat cushion 7. On its bottom, the rear seat cushion 7 has a projection or pin 8. The pin 8 is received in a forward hole 9 in the base 5, to hold the cushion 7 in the advanced position of Fig. 1.

The rear wall of the car is shown at 10. The back cushion of the rear seat is marked by the numeral 11. It rests against the rear wall 10 of the car at its upper edge, and at its lower edge against a stop strip 14 secured to the rear part of the base 5 of the rear seat. The back cushion 11 may be held in place by latches 12 on the back 10 of the car.

On its rear end, the auto body 1 has a rearwardly prolonged extension 15. The extension 15 preferably is not as high as the body 1. A platform 16 is secured within the extension 15 and is mounted at its forward end on the stop strip 14. There is a compartment 17 in the extension 15, above the platform 16. A receptacle 18 is formed in the extension 15, below the platform 16. The bottom 19 of the extension 15 and the platform 16 form a receptacle 18. Spare tires 20, or anything else which the automobilist wishes to carry are mounted in the receptacle 18. Access to the receptacle 18 is had by means of a closure 21. The upper edge of the closure 21 may be hinged at 22 to the rear edge of the platform 16. A mattress 23 and supports 24, which may be bars, are stowed in the compartment 17, behind the back cushion 11 of the rear seat.

Figure 3:
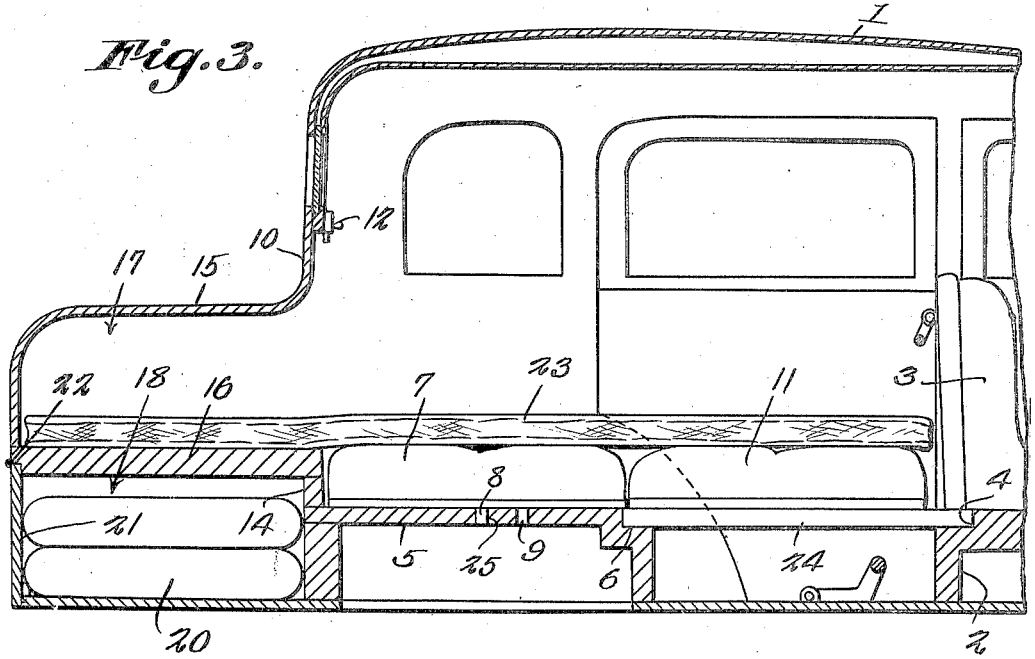
Fig. 3 is a longitudinal section showing the parts arranged to form a bed.
Figure 4:
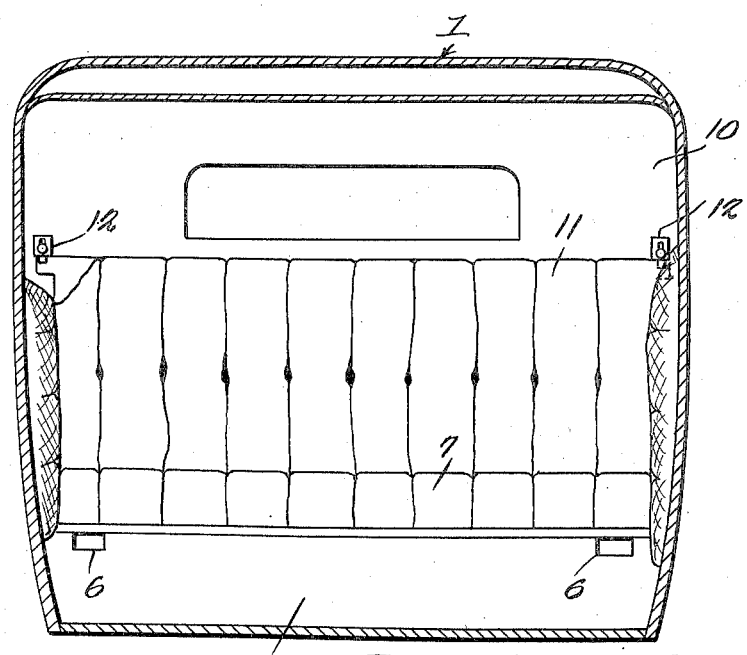
Fig. 4 is a cross section on the line 4—4 of Fig. 1.

The device as thus far described is as shown in Fig. 1. In order to make a bed, the second or back cushion 11 is removed from the position shown in Fig. 1. The supports 24 are taken out of the compartment 17. The forward ends of the supports 24 are placed in the recesses 4 of the base 2 of the front seat. The rear ends of the supports 24 are placed in the recesses 6 of the base 5 of the rear seat. The rear seat cushion 7 is moved backwardly, to close the space between the rear edge of that cushion and the strip 14, as shown in Fig. 3. When the rear seat cushion 7 is in the position of Fig. 3, the pin or projection 8 on the said cushion is received in a rear hole 25 in the base 5 of the back seat. The back cushion 11 is mounted on the supports 24, as in Fig. 3, between the rear seat cushion 7 and the back 3 of the front seat. The upper surfaces of the cushions 11 and 7 in Fig. 3 are substantially flush with the top of the platform 16. The mattress 23 is spread out over the platform 16, the cushion 7, and the cushion 11. Thus, a comfortable bed is afforded. The compartment 17 is adapted to receive the feet of the sleeper, when the parts are arranged as shown in Fig. 3.

The structure described affords a simple means whereby a bed may be made conveniently in an automobile, with a minimum number of supplemental or additional parts and, as shown in Fig. 1, ample space is provided for the housing of those parts, when they are not in use.

What is claimed is:

An automobile seat structure convertible into a bed, and comprising a horizontal front seat base, a horizontal rear seat base spaced from the front seat base, a horizontal rear platform located behind the rear seat base and disposed at a higher elevation than the rear seat base, a seat cushion disposed horizontally on the rear seat base and spaced from the forward edge of the rear platform, a back cushion disposed vertically and having its lower edge resting on the rear seat base between the rear edge of the seat cushion and the forward edge of the rear platform, means spaced from the rear platform and engaging the upper edge of the back cushion to hold the back cushion vertical, a support, means on each of said seat bases for removably mounting said support in horizontal position spanning the space between the front seat base and the rear seat base, the back cushion being removable and adapted to lie on the support and to span the space occupied thereby, in front of the seat cushion, and interengaging elements on the seat cushion and on the rear seat base, whereby the seat cushion is held in normal seat position spaced from the forward edge of the rear platform or may be shifted rearwardly to provide space for the back cushion in front of the seat cushion and be held securely in bed-forming position adjacent the forward edge of the platform, said cushions being of a thickness such that the upper surfaces of both cushions and of the rear platform are substantially horizontal.

RANDOLPH BOYD.